United States Patent [19]

Shimizu et al.

[11] Patent Number: 4,731,782
[45] Date of Patent: Mar. 15, 1988

[54] DIGITAL LOCAL SWITCHING SYSTEM FOR INTEGRATED SERVICE DIGITAL NETWORK

[75] Inventors: Tomoyoshi Shimizu; Yoshinori Yoshida; Masao Hashimoto; Hideki Nakane, all of Tokyo, Japan

[73] Assignee: NEC Corporation, Japan

[21] Appl. No.: 872,810

[22] Filed: Jun. 11, 1986

[30] Foreign Application Priority Data

Jun. 12, 1985 [JP] Japan .............................. 60-126263
Jun. 12, 1985 [JP] Japan .............................. 60-126264
Jun. 12, 1985 [JP] Japan .............................. 60-126265

[51] Int. Cl.$^4$ .................................................. H04J 3/22
[52] U.S. Cl. ..................................... 370/60; 370/110.1
[58] Field of Search .................. 370/60, 94, 89, 110.1, 370/68.1

[56] References Cited

U.S. PATENT DOCUMENTS 4,413,337 11/1983 Dauphin et al. ...................... 370/58

Primary Examiner—Douglas W. Olms
Assistant Examiner—James E. Busch
Attorney, Agent, or Firm—Laff, Whitesel, Conte & Saret

[57] ABSTRACT

An integrated service network ("ISDN") is structured to connect subscriber lines through a packet switching system to incoming or outgoing packet switching calls without passing them through a circuit switching system. This effectively uses the speech path of the circuit switching section instead of using it for packet switching calls. At the same time, the invention minimizes the influence of the introduction of the ISDN upon the software of the circuit switching section. The ISDN digital switching network applies to circuit switching calls which are switched at a local switch and to packet switching calls which are to be switched at a toll switch. The digital switching system separates calls into circuit switching calls which are transferred through B channels, packet switching calls which are transferred through B channels, and packet switching calls which are transferred through D channels in order to connect the circuit switching calls to a time division switch and the packet switching calls to a packet multiplexer. The packets are concentrated and multiplexed into separated packet switching calls. The circuit switching calls from the time division switch are multiplexed with the packet switching calls from the packed multiplexer and are placed in predetermined time slots in accordance with a band width designated corresponding to respective call traffic.

1 Claim, 4 Drawing Figures

DIGITAL LOCAL SWITCHING SYSTEM FOR INTEGRATED SERVICE DIGITAL NETWORK

BACKGROUND OF THE INVENTION

This invention relates to a digital local switching system for switching voice and data signals comprising circuit switching calls, packet switching calls, and digitized signalling information.

The International Telegraph and Telephone Consultative Committee (CCITT) specified the network for offering digital communication service and designated it as an "Integrated Service Digital Network (ISDN)". The CCITT submitted I. Series recommendation on the basic specifications toward the end of 1984. According to this basic recommendation, ISDN's user network interface determines the boundary conditions for effectively connecting user's terminals with the network for optimal communication. The network is constructed with two B channels of 64 kilobits per second (Kpbs) and one D channel of 16 (Kbps) (2B+D). This interface is referred to as the basic access interface which enables, for example, communication through a speech channel (B1) of 64 Kbps, a data channel (B2) of 64 Kbps, and a data channel (D) for low speed packets of 16 Kbps.

The ISDN's user network interface allows each call to select various different services for use. Demands for service to the network or demands for a call are expressed in a message called SETUP. The SETUP messages are packetized and transferred through the D channel from a user to the network. The SETUP message is written with (1) a call reference value for identifying the call, (2) a bearer capability for designating the transfer rate and mode of connection needed by the particular call, (3) the channel identification for identifying which of the two B channels or D channel should be used, and (4) an ISDN destination address of the other party for designating the telephone number thereof. The function to deal with the call controlling procedures with such messages is called "layer-3" which is referred to in sections I.450 and I.451 of the above-mentioned CCITT Recommendation I. Series. The procedure for correctly transferring the messages of the layer-3 is called "layer-2" which is mentioned under the title; "Link Access Procedure on the D channel (LAP-D)" in I.440 and I.441 of the CCITT Recommendation. The LAP-D has functions such as connecting/disconnecting to and from a data link, identifying frames, sequence control, error detection, error restoration, flow control, etc. The LAP-D is provided with a service access point identifier ("SAPI") for identifying the service access point between the layers 2 and 3.

Sections I.430 and I.431 of the CCITT Recommendation specify channel structure, conditions or activation and suspension, speed, electric voltage level, number and forms of connector pins, etc. of layer 1.

In practice, however, various problems should be solved in order to practically structure an ISDN based on the specifications decided as above. One of those problems is how to construct a local switching system. In an ISDN, various different services should be received through a common subscriber interface. Firstly, the switching system should accommodate the user network interface, as specified by the CCITT Recommendation. Secondly, the switching system should connect calls of various types which are incoming from and outgoing to the ISDN subscribers, for instance, calls having both attributes of a circuit switching call and a packet switching call. The packet calls are classified into two types in ISDN; i.e., those transferred via a D channel, and those transferred via a B channel. Thirdly, the ISDN switching system should handle both of them.

As almost all of the prior switching systems are made for telephones, even if they are digital switching systems, they should be added with an ISDN digital line interface on the side of users in order to connect ISDN subscribers. Even if these ISDN subscribers are successfully connected, the prior switching systems cannot support both the circuit and the packet switching. More particularly, since the prior telephone switching systems are made for circuit switching, it is impossible for them to handle packet switching which is fundamentally different from circuit switching, in the switching system.

In order to realize a packet switching service of ISDN subscribers, a prior local switching system should be either replaced with a digital telephone exchange with means for processing packet-switched data in addition to circuit switched data like the one disclosed in U.S. Pat. No. 4,486,878; or it should be provided separately with a switching system dedicated exclusively for packet switching either at the local switch or toll switch levels. Circuit switching calls are controlled to be connected to a circuit switching system and packet switching calls are controlled to be connected to a packet switching system separately.

The method disclosed in U.S. Pat. No. 4,486,878 is simpler in the structure of the networks and is most preferable in service, when viewed from ISDN subscriber side. The method may therefore be the most popular solution when ISDN prevails widely in future. But then, all of the prior switching systems should be invalidated for ISDN subscribers. Thus, an immediate application of the patent method may not be very economical.

If the separate switching method is adopted, the switching section of a prior digital switching system can be still used as the switching section for circuit switching call. In order to promote the introduction of ISDN, the separate switching method seems to be a more feasible method, at least during the initial stage in the ISDN introduction process.

If the latter method should be adopted, however, a problem still remains unsolved; namely, at which location within a network should the switching system dedicated to the packet switching be placed. It is desirable that the location be decided upon depending on the ratio of the traffic between packet switching calls and circuit switching calls. More specifically, if the traffic ratio is high in the packet switching calls, the switching system should be installed at a local switch. If the traffic ratio is high in the circuit switching calls, it should be installed at a toll switch. Generally, it is expected that, in the initial stage of implementation of ISDN, the traffic of packet calls is much smaller than that of circuit switching calls. Thus, it is considered economically more practical for the packet switching system to be installed at a toll switch and subscribers should have access to it whenever necessary.

In order to operate such a toll connecting trunk most effectively in view of economical considerations, it is desirable that the tool connecting trunk can be shared in use by circuit switching calls and packet switching calls. The ratio in the number between channels used by packet switching calls and those used by circuit switching calls on the toll connecting trunk should be variable or, in other words, should be a variable boundary in structure. The ratio may be semi-variable, but is preferred to be dynamically variable to achieve a higher effect. The existing systems cannot meet such requirements.

SUMMARY OF THE INVENTION

An object of this invention is to provide a digital switching system which is capable of connecting various services of circuit switching as well as packet switching on one single local digital line while minimizing the influence on the local switching system. The invention is capable of introducing ISDN with higher economical effect while minimizing the influence on the network in the initial stage thereof.

Another object of this invention is to provide a digital switching system which can minimize the necessity of making changes in a local switching system which otherwise is entailed by accommodating ISDN subscribers, or in other words, which can connect ISDN subscribers by using the switching section of the existing local telephone digital switching system without modifications and by adding an ISDN subscriber interface.

Still another object of this invention is to provide a digital switching system which is structured so that toll connecting trunk (TCT) can be shared commonly by circuit switching calls and packet switching calls and thus to secure a higher effective use of the trunk.

Yet another object of this invention is to provide a digital switching system which is structured to connect packet switching calls which are incoming from or outgoing to ISDN subscribers to a packet switching system without passing them through a circuit switching system to thereby effectively use a speech path of the circuit switching section instead of using it for packet switching calls and at the same time, to minimize the influence of the ISDN introduction on the software of the circuit switching section.

In the ISDN digital switching network to which this invention is applicable, it is assumed that circuit switching calls are to be switched at a local switch and that packet switching calls are to be switched at a toll switch.

According to one aspect of the invention, a digital switching system is provided which comprises: means for separating calls into circuit switching calls that are transferred through B channels, packet switching calls that are transferred through B channels, and packet switching calls that are transferred through D channels so as to connect the circuit switching calls to a time division switch for circuit switching and the packet switching calls to a packet multiplexer, respectively; means for concentrating and packet-multiplexing said separated packet switching calls; and means for multiplexing the circuit switching calls from said time division switch and the packet switching calls from said packed multiplexing means in predetermined time slots in accordance with a band width designated in correspondence with respective call traffic thus multiplexed calls to transmission lines.

BRIEF DESCRIPTION OF THE DRAWINGS

The above and other objects, features and advantages of the present invention may be fully understood from the following detailed description and accompanying drawings wherein.

The same reference numerals denote the same structural elements in the drawings.

DESCRIPTION OF THE PREFERRED EMBODIMENT

Figure 1:
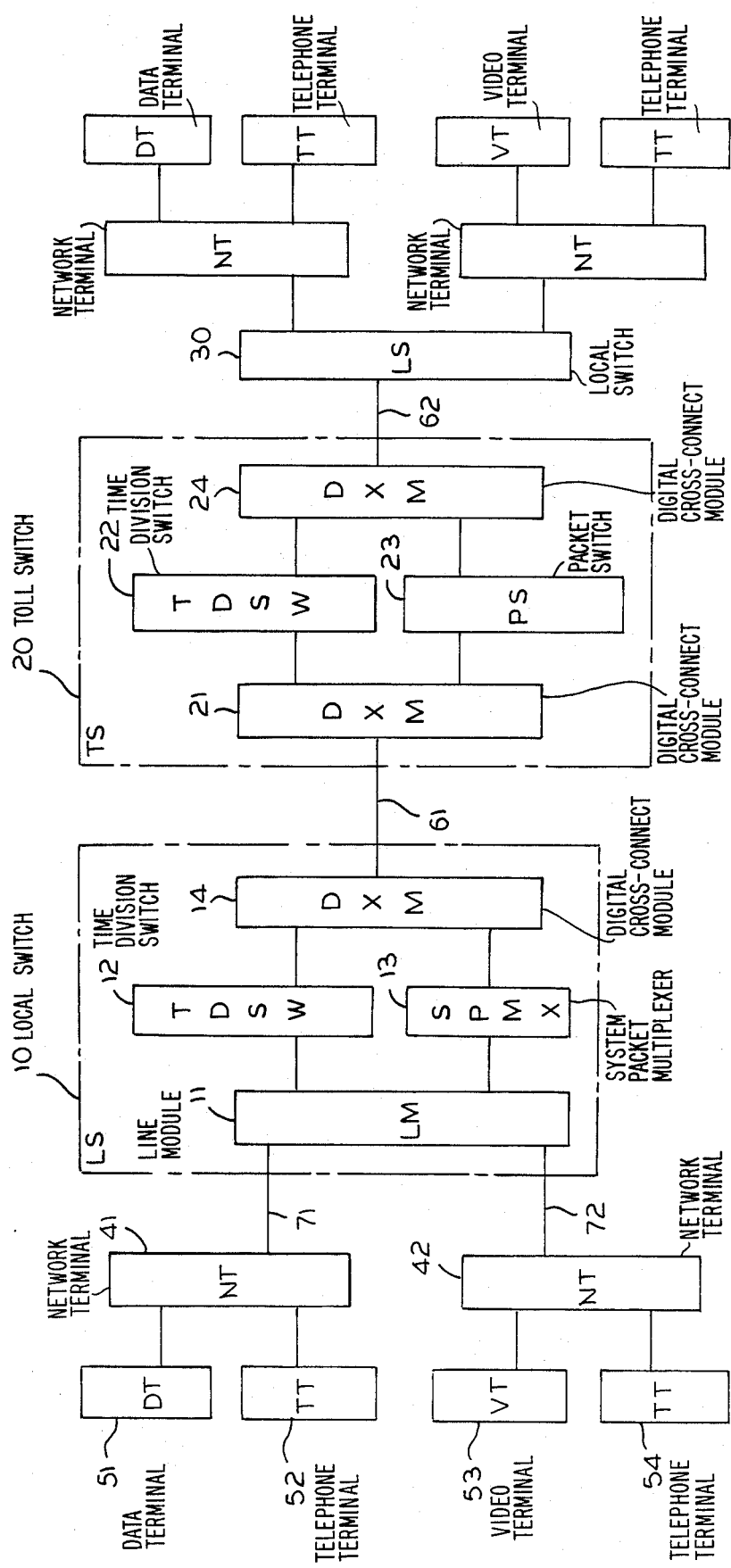
FIG. 1 is a block diagram of an embodiment of the ISDN networks to which this invention system is applicable.

Referring to FIG. 1, the digital switching network to which this invention is applicable includes local switches (LS's) 10, 30 and a toll switch (TS) 20. In the following description, the LS 10, the TS 20, and digital terminals connected to the LS 10 are taken as an example. Digital terminals such as a data terminal (DT) 51 and a telephone terminal (TT) 52 are connected to a network terminal (NT) 41. Likewise, digital terminals such as video terminal (VT) 53 and a telephone terminal (TT) 54 are connected to a network terminal (NT) 42. The above combination of the digital terminals is a mere example. The NT's 41 and 42 are connected to a line module (LM) 11 in the LS 10 via digital access lines (DA's) 71 and 72, respectively. The NT's 41 and 42 are arranged for adjusting the speed between channels on the DA's 71, 72 and the LS 10. The LM 11 is connected to a time division switch (TDSW) 12 for circuit switching and a system packet multiplexer (SPMX) 13.

Voice signals, data signals and signalling information given from the DT 51, TT's 52 and 54, and the VT 53 via the NT's 41 and 42 are separated within the LM 11 into the circuit switching calls which are transferred through B channels, the B channel pocket calls which are transferred through D channel. The circuit switching calls are connected to the TDSW 12 while the B channel packet calls and D channel packet calls are connected to the SPMX 13 respectively.

The B channel packet calls are mainly used for the packets of relatively high speed, such as 64 Kbps. The D channel packet calls are used for packet of lower speed. The toll connecting trunks (TCT) 61 and 62 are general digital lines and have bit rates of, for instance, 2.048 megabits per secong (Mpbs) ((primary group), 8.448 Mbps (secondary group) [in North America, 1.544 Mbps (primary group) and 6.312 Mbps (secondary group)]. The TCT 61 is connected to digital cross-connect modules (DXM's) 14 and 21 in switches LS 10 and TS 20.

The DXM's 14, 21 and 24 are line interface units for respective switches. More particularly, DXM 14 in the LS 10 is connected to the TDSW 12 and to the SPMX 13. The DXM 14 separately inserts/drops the packet calls which have been concentrated and multiplexed at the at the SPMX 13 together with circuit switching calls which are communicated via the TDSW 12 in channels of the TCT 61 which have been designated in advance. Although not shown in the figures, the DXM of the LS 30 has a similar function and is able to separately insert/drop the packet calls and circuit switching calls in the channels in the TCT 62 which are designated in advance.

Any of the channels may be designated arbitrarily, but once designated, that channel should be used in a semifixed manner until the designation is changed. The ratio of the channels in the number used for packet switching calls against the number used in the circuit switching calls depends on the traffic of the time and decided by the negotiation between the LS 10 and the TS 20.

At the toll switching center TS 20, circuit switching calls or ("CS") and packet switching calls are separated depending on the channels of the digital line designated by DXM's 21 and 24 so that circuit switching calls are to be processed by a time division switch (TDSW) 21 for a circuit switching call while packet switching calls are to be processed by a packet switch (PS) 23.

Figure 2:
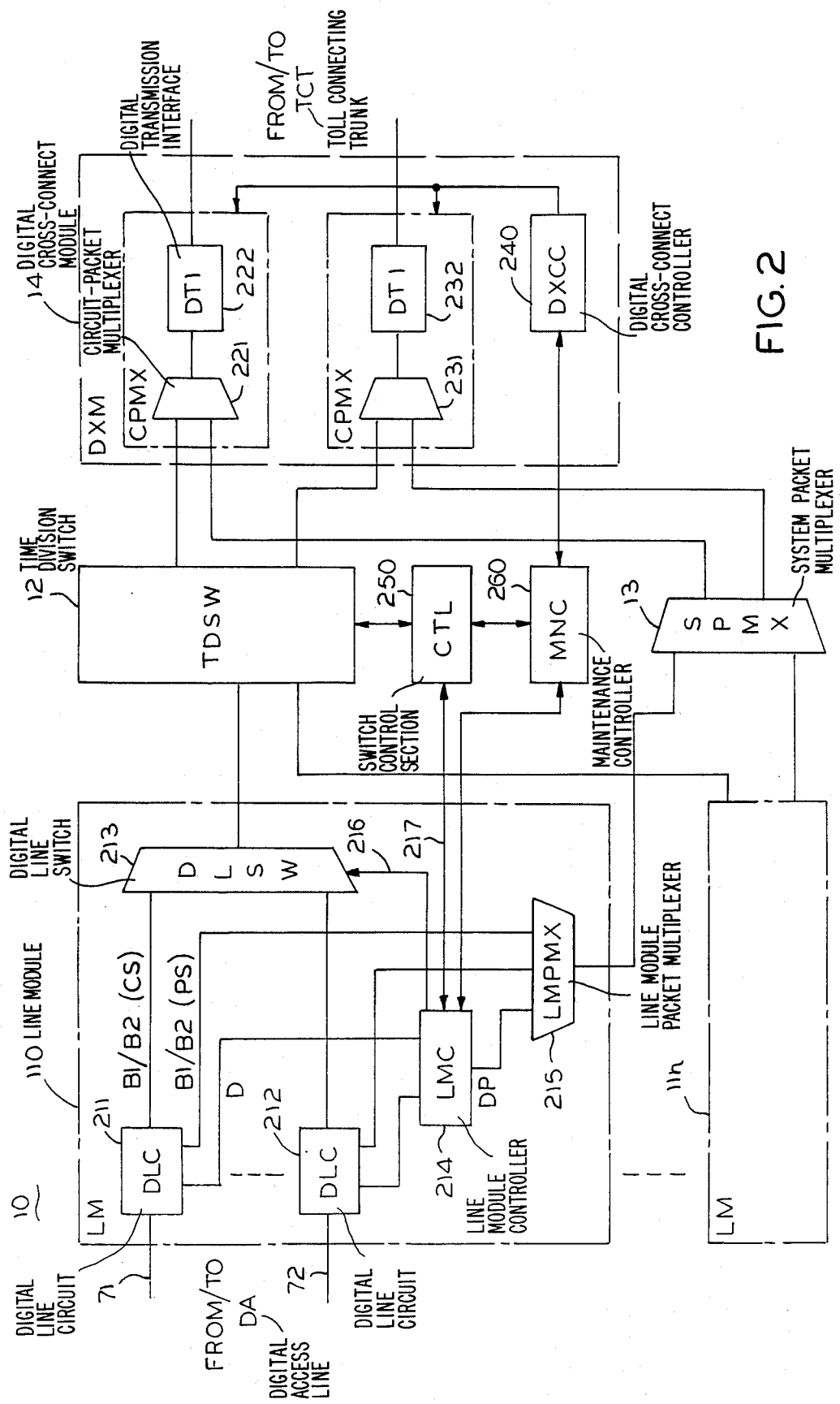
FIG. 2 is a block diagram of an embodiment of this invention.

Referring now to FIG. 2, an embodiment of this invention local switching system (LS) 10, shown in FIG. 1, provides a plurality of line modules (LM) $11_0$ through $11_n$. Each LM has digital line circuits (DLC) 211 and 212. The DLC's 211 and 212 are connected at interfaces (which are called "U" interfaces) to digital access lines 71 and 72 within the ISDN local interface. The DLC's 211 and 212 have the terminating functions of layer 1 (physical layer) and layer 2 (data link layer). More specifically, DLC's 211 and 212 conduct electric terminating for the U interface, terminating for the layer 1 such as synchronization and terminating for the LAP-D.

Figure 3:
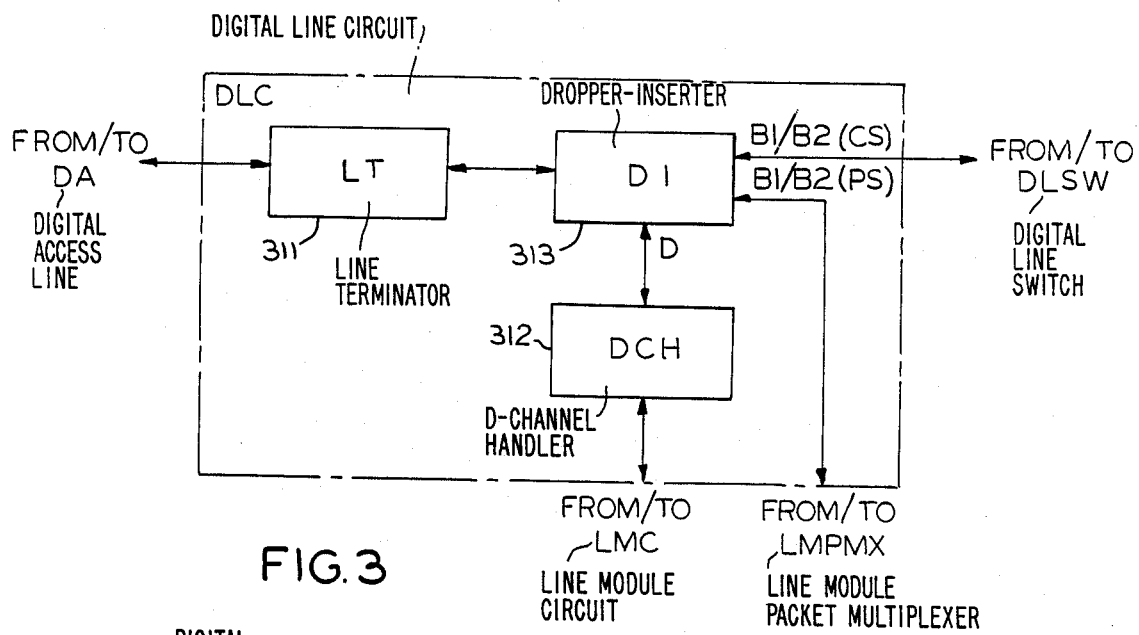
FIG. 3 is a block diagram to show the details of the digital line circuit shown in FIG. 2.

Referring now to FIG. 3, DLC's 211 and 212 comprise respectively a line terminator (LT) 311, a D channel handler (DCH) 312 and a dropper/inserter (DI) 313. The LT 311 terminates the layer 1 of a U interface. The DCH 312 terminates the LAP-D. The DI 313 has the function to separately insert/drop B1, B2 and D channels from the format of the ISDN basic interface of (2B+D) and to branch out to the digital line switch (DLSW) 213 when B1 and B2 channels are carrying ciruit switching calls to the line module packet multiplexer (LMPMX) 215 when channels B1 and B2 are carrying packet switching calls. The CCITT recognizes that the matters related to U interfaces are a national matter and that different specifications will most probably be adapted by respective nations.

Depending on whether B1 and B2 are used for circuit switching calls, CS packet switching calls, the line module controller (LMC) 214 controls the connection of channels B1 and B2 to either the DLSW 212 or the LMPMX 215 respectively. More specifically, a signalling information from a digital terminal is conveyed through the D channel to either the DLC 211 or the DLC 212. The signalling information includes the information needed to indicate whether the originating call is a packet switching call or a circuit switching call. With such information, the LMC 214 controls the connection of channels B1 and B2 to either the DLSW 213 or the LMPMX 215. The outputs from DLC's 211 and 213, two B channels (B1 and B2) which are circuit switching calls are respectively connected to the DLSW 213. They may be connected by a separate highway or may be multiplexed on single highway.

The DLSW 213 concentrates and multiplexes B channels from DLC's 211 and 212 and connect the same to the TDSW 12.

The TDSW 12 further multiplexes circuit switching calls which have been concentrated by a plurality of line modules LM's $11_0$ through $11_n$ to a degree which is identical to the multiplex of the main highway and connects speech lines to line module or trunk module of a relevant opposite party via switch network whenever necessary. At each DCH 312 of DLC's 211 and 212, flag synchronziation, zero insertion/deletion, control of errors caused by re-transfer and other processing on layer 2 are conducted with the subscriber's terminal to which they are connected and conveys either the circuit signal information or the D channel packet to the LMC 214.

The LMC 214 receives D channel packets from DLC's 211 and 212, and checks SAPI in the D channel packets. If the SAPI is 0, the LMC 214 processes the circuit signal data for necessary call processing. Along with the processing, the necessary control circuit is connected within the system such as communication between the control data 216 of the DLSW 213 and the control data 217 of a switch control section (CTL) 250 or the controlling section of the TDSW 12. The D channel packets corresponding to SAPI=16 are separated from control data, added to the physical address data which correspond to the connection position of the subscribers, multiplexed by the LMC 214 and sent to the LMPMX 215. The LMPMX multiplexes D channel packets from the LMC 214 and B channel packets from DLC's 211 and 212, to feed them to the SPMX 13. The packets which use the B channel are added to the physical address corresponding to the position of the connection of subscribers, in a manner similar to D channel packets. Conversely, the packets received from the SPMX 13 are distributed to appropriate LM's depending on the physical address data included therein. The SPMX 13 are installed in the unit of a plurality of line modules (LM) $11_0$ through $11_n$. On the up-link side thereof (the direction from LS toward TS is called "up-link" and the reverse direction is called "down-link" herein), packets received from each line module are added to address data identifying line modules to which or from which the packet comes or goes, further multiplexed and sent out to a digital cross-connect module (DXM) 14. On the side of the down-link, the line modules LM which should be allocated to the module is determined by referring to the address data. The packet is then sent out to a relevant module.

The DXM 14 comprises circuit packet multiplexer (CPMX) 221 and 231 for multiplexing circuit switching calls from the TDSW 12 and packet switching calls from the SMPX 13, digital transmission interfaces (DTI) 222 and 231, and a digital cross-connect controller the DXCC 240 for controlling the combination of these plural CPMX's 221 and 231 with DTI's 222 and 232.

Figure 4:
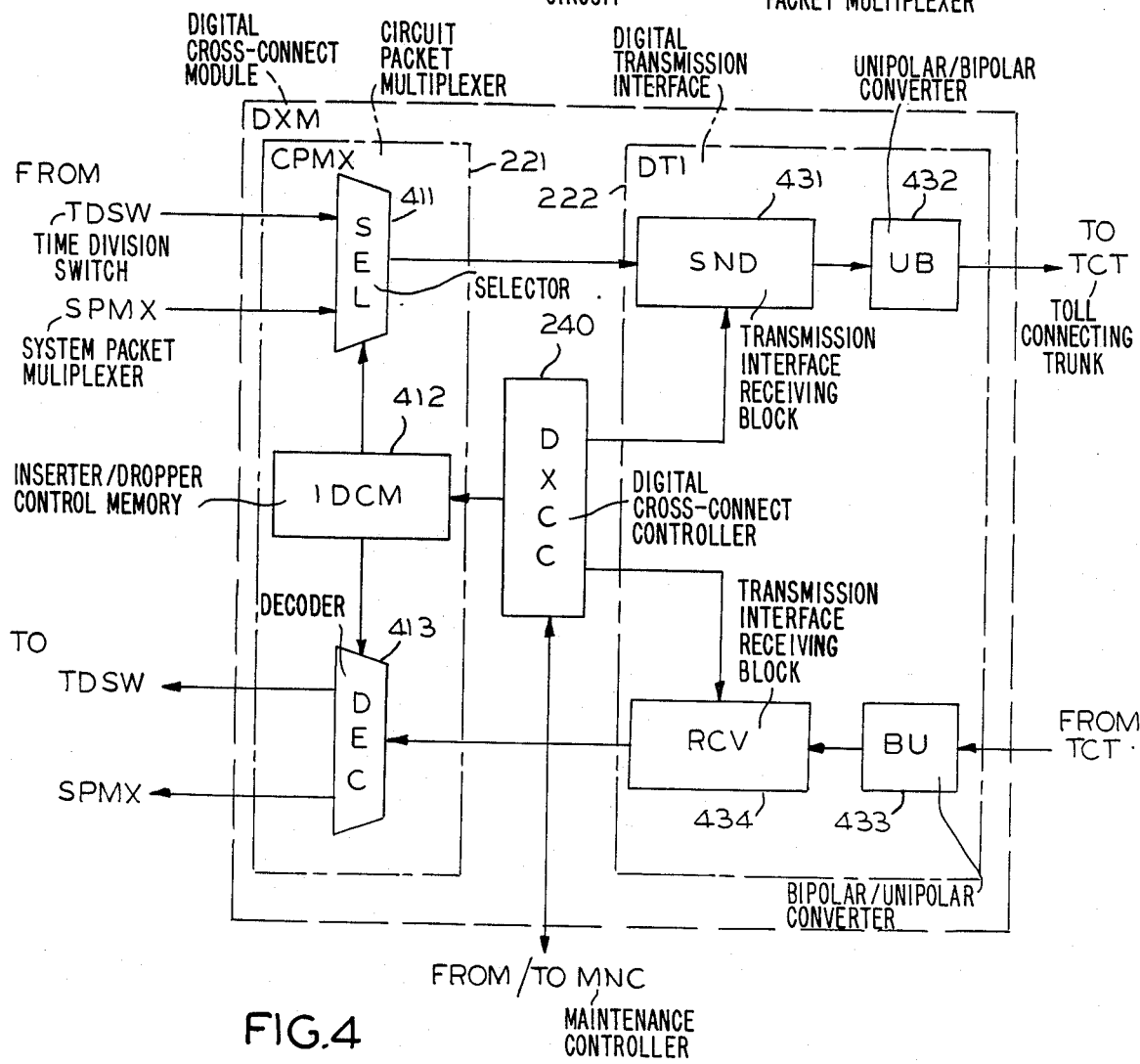
FIG. 4 is a block diagram to show the details of the digital cross-connect module shown in FIG. 2.

Referring to FIG. 4, the DXM will be described in more detail. The DXM comprises the CPMX 221, the DTI 222 and the DXCC 240. The CPMX 221 provides a selector (SEL) 411 on the up-link side for selecting paths from the TDSW 12 and from the SPMX 13 in the unit of time slots. Moreover the CPMX 221 provides the decoder or DEC 413 on the down-link side for separating predetermined time slots of circuit switching calls and for adding the remaining time slots with idle channel patterns to send them to the TDSW 12. It also removes circuit switching calls from the packet switching calls to send them to the SPMX 13.

The CPMX 221 is a variable multiplexer and is controlled by an inserter/dropper control memory (IDCM) 412 in time slots. The data of the memory from the DXCC 240 is written into and read out of the IDCM 412. The DXCC 40 is a controlling circuit for the whole of the DXM 14. The content of the IDCM 412 is controlled by a maintenance controller (MNC) 260 and is re-written via the DXCC 240, to thereby change the band width which the circuit switching calls and packet switching calls use.

A digital transmission interface (DTI) 222 interfaces the TCT 61 and provides functions such as bit synchronization, frame synchronization, frame alignment, fault monitoring on digital transmission lines, etc. A transmission interface receiving block (SND) 431 has the functions of inserting a frame pattern, zero suppression, sending out alarm signals to the opposite station, etc. A unipolar/bipolar converter (UB) 432 converts the unipolar signals within the switching system into bipolar signals on the digital transmission line.

One the side of the down-link, the bipolar signals on the digital transmission line from the toll switch are converted into unipolar signals within the switching system and are sent to a transmission interface receiving block (RCV) 434. The RCV 434 conducts processing such as bit synchronization, frame synchronization, frame alignment processing for aligning the frame phase of digital transmission line to the phase of the switching system. The RCV 434 monitors faults on the digital transmission lines and, if it finds a fault, reports the fault to the DXCC 240. The DXCC 240 then reports the fault to the MNC 260.

The MNC 260 is a device for monitoring faults and for controlling devises for maintenance within the switching system. In order to achieve such tasks, the MNC 260 receives and transmits from and to LMC's 214 and 250 the data which is necessary for the operation of the system.

What is claimed is:

1. A digital local telephone exchange system for accommodating a plurality of digital access lines, each of said access lines being ascribed to a basic access interface having two B channels for circuit switching calls and packet switching calls and one D channel for packed signalling information or data, said system comprising:

a plurality of line module means for separating said circuit switching calls and packet switching calls from said digital access lines;

each of said line module means including:

a plurality of line circuit means for separating said B channel circuit switching calls and packet switching calls and said D channel packeted signalling information or data;

digital line switch means for multiplexing circuit switching calls separated by each of said line circuit means;

line module packet multiplexer means;

line module controller means connected to said each line circuits for identifying said packeted signalling information or data on said D channel, for controlling calls by using said signalling information and for outputting said packeted data to said line module packet multiplexer; and said line module packet multplexer means multiplexing B channel packets from said line circuits and D channel packets from said line module controller;

system packet multiplexer means for multiplexing said B channel packets from each of said line module packet multiplexer;

time division switch means for connecting circuit switching calls from said line module means; and digital cross-connect module means having a plurality of circuit-packet multiplexer means corresonding to a toll connecting trunk, each of circuit-packet multiplexer means receiving input circuit switching calls from said time division switch means and packet switching calls from said system packet multiplexer means for mutliplexing these calls to said toll connecting trunk.

* * * * *